Figure 1:
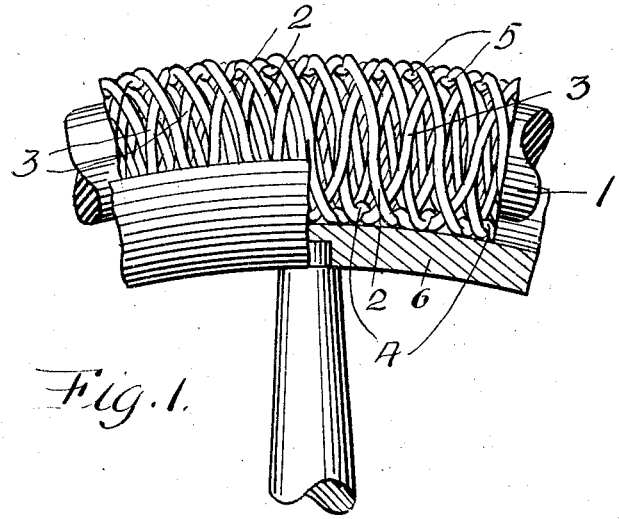

F. MARINICS.
TIRE.
APPLICATION FILED OCT. 6, 1911.

1,022,856. Patented Apr. 9, 1912.

WITNESSES
Samuel Payne
Ralph C. Evert

INVENTOR
F. Marinics,
BY
ATTORNEYS

UNITED STATES PATENT OFFICE.

FRANK MARINICS, OF EXPEDIT, PENNSYLVANIA.

TIRE.

1,022,856.     Specification of Letters Patent.     Patented Apr. 9, 1912.

Application filed October 6, 1911. Serial No. 653,186.

*To all whom it may concern:*

Be it known that I, FRANK MARINICS, a subject of the King of Hungary, residing at Expedit, in the county of Cambria and State of Pennsylvania, have invented certain new and useful Improvements in Tires, of which the following is a specification, reference being had therein to the accompanying drawing.

This invention relates to tires, especially designed for automobile trucks and similar vehicles.

The primary object of my invention is to combine metal and rubber in a manner that will provide a durable and non-penetrable resilient tire for a vehicle wheel.

A further object of this invention is to provide a non-skidding tire that is simple in construction and not liable to injury by ordinary use.

With the above and other objects in view the invention resides in the novel construction to be hereinafter specifically described and then claimed.

Reference will now be had to the drawing, wherein:—

Figure 3:
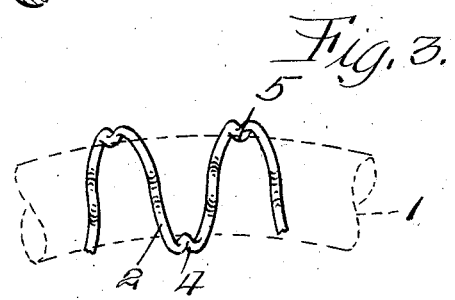
Figure 2:
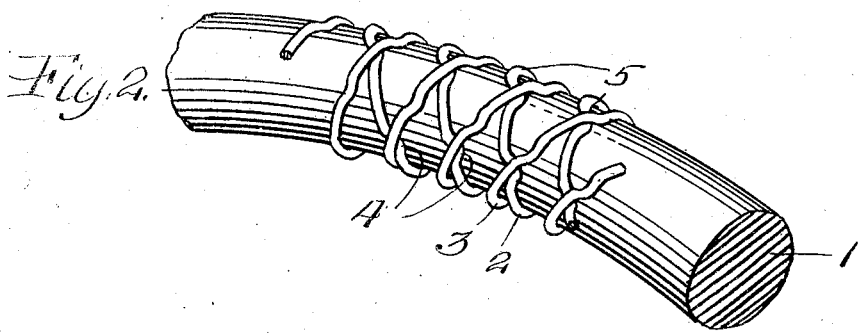

Figure 1 is a side elevation of a portion of the tire, in accordance with this invention. Fig. 2 is a perspective view of a portion of the tire, and Fig. 3 is a side elevation of one of the springs adapted to form part of the tire.

The reference numeral 1 denotes a solid rubber ring and encircling said ring are spiral springs 2 and 3. One of said springs arranged within the other and mounted directly upon the periphery of the rubber ring 1, the outer spring snugly engaging the inner spring. The coils of the spring 2 extend in an opposite direction with respect to the coils of the spring 3. The convolutions of the spring 3 cross the convolutions of the spring 2. The intersections of the convolutions of the springs are kinked or provided with raised or lowered portions 4 and 5, these portions providing shoulders that prevent displacement of the convolutions of one spring relatively to the convolutions of the adjoining spring, besides allowing the springs to form a net work upon the ring 1, especially when the convolutions of the springs are closely wound or formed. This is best shown in Fig. 1, wherein it will be observed that the ring 1 is incased within the springs, and these springs coöperate with the ring 1 in providing a yieldable cushion or resilient tire. The tire is supported upon a felly or rim 6, the resiliency of the tire permitting of it being easily sprung onto the felly, or in some instances the felly can be made with a detachable side section that permits of the tire being easily and quickly placed in position.

What I claim:—

A tire comprising a hard rubber ring cylindrical in cross section at any point throughout, a pair of spiral springs, each formed of round stock, one arranged within the other, the inner of said springs snugly engaging the periphery of said ring, the outer spring snugly engaging the inner spring, the convolutions of the outer spring extending in an opposite direction with respect to the convolutions of the inner spring, the convolutions of each spring being disposed diagonally with respect to said ring, the convolutions of one spring being kinked at their intersection with the convolutions of the other spring thereby preventing displacement of one spring relatively to the other spring.

In testimony whereof I affix my signature in the presence of two witnesses.

FRANK MARINICS.

Witnesses:
A. M. SHOEMAKER,
W. A. W. NOCK.